United States Patent
Liu et al.

(10) Patent No.: US 12,548,827 B2
(45) Date of Patent: Feb. 10, 2026

(54) BATTERY CELL CASE HAVING A DISSOLUBLE MECHANISM AND HIGH-CAPACITY BATTERY HAVING THE STRUCTURE

(71) Applicant: AMERICA NATIONAL POWER STORAGE LLC, Lewes, DE (US)

(72) Inventors: Yi Liu, Xi'an (CN); Zhengjun Lei, Xi'an (CN); Gaofeng Zheng, Xi'an (CN)

(73) Assignee: AMERICA NATIONAL POWER STORAGE LLC, Lewes, DE (US)

(*) Notice: Subject to any disclaimer, the term of this patent is extended or adjusted under 35 U.S.C. 154(b) by 462 days.

(21) Appl. No.: 18/188,662

(22) Filed: Mar. 23, 2023

(65) Prior Publication Data
US 2023/0318096 A1 Oct. 5, 2023

Related U.S. Application Data

(60) Provisional application No. 63/325,235, filed on Mar. 30, 2022.

(51) Int. Cl.
| | |
|---|---|
| H01M 50/00 | (2021.01) |
| H01M 50/121 | (2021.01) |
| H01M 50/618 | (2021.01) |
| H01M 50/655 | (2021.01) |

(52) U.S. Cl.
CPC ....... *H01M 50/121* (2021.01); *H01M 50/618* (2021.01); *H01M 50/655* (2021.01)

(58) Field of Classification Search
CPC . H01M 50/121; H01M 50/655; H01M 50/618
See application file for complete search history.

(56) References Cited

FOREIGN PATENT DOCUMENTS

| | | | |
|---|---|---|---|
| CN | 216085057 U | | 3/2022 |
| JP | 2012151032 A | * | 8/2012 |

OTHER PUBLICATIONS

Urabe, Nonaqueous Electrolyte Secondary Battery, Aug. 2012, See the Abstract. (Year: 2012).*

* cited by examiner

*Primary Examiner* — Tiffany Legette
*Assistant Examiner* — Monique M Wills
(74) *Attorney, Agent, or Firm* — Scully, Scott, Murphy & Presser, P.C.

(57) ABSTRACT

Disclosed are a battery cell case having a dissoluble mechanism and a high-capacity battery. The battery cell case comprises at least one dissoluble mechanism, which comprises an isolating assembly and a dissoluble assembly; the battery cell case is provided with an opening, where the isolating assembly and the dissoluble mechanism are arranged sequentially in a direction away from the battery cell case; when the dissoluble assembly contacts with electrolyte outside the battery cell case, the isolating assembly is opened because the dissoluble mechanism is dissolved, thereby the interior of the battery cell case communicates with the exterior of the battery cell case. The high-capacity battery comprises at least two battery cells and an electrolyte storage pipeline, where the electrolyte storage pipeline comprises a main pipeline and a plurality of branch pipes, the branch pipes are in one-to-one correspondence to the openings of the battery cell cases.

19 Claims, 5 Drawing Sheets

BATTERY CELL CASE HAVING A DISSOLUBLE MECHANISM AND HIGH-CAPACITY BATTERY HAVING THE STRUCTURE

CROSS-REFERENCE TO RELATED APPLICATIONS

This application claims priority to U.S. Provisional Application No. 63/325,235, filed on Mar. 30, 2022, the subject matter of which is hereby incorporated by reference in its entirety.

TECHNICAL FIELD

The present application relates to the field of batteries, in particular to a battery cell case having a dissoluble mechanism and a high-capacity battery having the structure.

BACKGROUND

At present, among lithium-ion batteries available in the market, prismatic lithium-ion batteries have 300 Ah maximum capacity, while cylindrical lithium-ion batteries have 100 Ah or lower maximum capacity. Under the background of "peak carbon dioxide emissions" and "carbon neutrality", the energy storage industry is expected to develop by leaps and bounds. However, limited by unit battery capacity, a plurality of lithium-ion batteries have to be connected in series and in shunt in actual energy storage applications, resulting in numerous connecting parts, complicated and cumbersome connection steps, large quantities of battery management systems, wires, and battery cases, and, consequently, a high energy storage cost.

It is an efficient approach to increase the unit capacity of battery cells to reduce the cost of existing energy storage systems. It is simple and convenient to form a high-capacity Li-ion battery structure by connecting existing battery cells in shunt. However, how to make the electrolyte cavities of a plurality of battery cells to communicate with the electrolyte cavity of a high-capacity battery formed from the battery cells is a difficult problem.

SUMMARY

In view of the above technical problem, it is necessary to provide a battery cell case, which has a simple structure, and enables the opening of a battery cell to be opened without mechanical operation, so that the electrolyte cavities of battery cells can communicate with the electrolyte cavity of a high-capacity battery formed from the battery cells. In addition, it is necessary to provide a pipeline system, which enables the battery cells to be arranged in a uniform electrolyte system, so as to create a uniform balanced electrolyte environment.

The technical scheme of the present application is as follows:

A battery cell case having a dissoluble mechanism, wherein the battery cell case is provided with at least one dissoluble mechanism, which comprises an isolating assembly and a dissoluble assembly; the battery cell case is provided with an opening, where the isolating assembly and the dissoluble assembly are arranged sequentially in a direction away from the battery cell case; the dissoluble assembly fixes the isolating assembly, and the isolating assembly abuts against the dissoluble assembly so that they seal the opening together; when the dissoluble assembly contacts with electrolyte outside the battery cell case, the isolating assembly is opened because the dissoluble mechanism is dissolved, thereby the interior of the battery cell case communicates with the exterior of the battery cell case.

Preferably, the dissoluble assembly is made of one or more of polymethyl methacrylate, polyvinyl chloride, polycarbonate or ABS plastic material.

Preferably, the dissoluble assembly is a polymethyl methacrylate plate.

Preferably, the thickness of the dissoluble assembly is not greater than 2 mm.

Preferably, the isolating assembly is a sphere or a cone.

Preferably, a fixing part is provided outside the opening, the isolating assembly is arranged inside the fixing part and doesn't contact with the fixing part, and the dissoluble assembly is connected to the fixing part and abuts against the isolating assembly to seal the opening.

Preferably, the isolating assembly is a protective film that is insoluble in the electrolyte.

Preferably, the isolating assembly covers the opening, and the isolating assembly covers a side of the dissoluble assembly that faces the opening to seal the opening.

Preferably, a fixing part is arranged at the opening to limit the movement of the dissoluble mechanism.

Preferably, the thickness of the protective film is smaller than 0.1 mm.

A battery assembly, comprising an electrode assembly and a battery cell case having a dissoluble mechanism, wherein the electrode assembly is arranged in an encapsulating cavity of the battery cell case.

A high-capacity battery, comprising at least two battery cells and an electrolyte storage pipeline, wherein the electrolyte storage pipeline comprises a main pipeline that is a multi-branch electrolyte storage pipeline and a plurality of branch pipes, the main pipeline has an electrolyte storage cavity therein for accommodating the electrolyte, the branch pipes are arranged between the main pipeline and the battery cell cases, each of the battery cell cases is provided with an opening, the branch pipes are in one-to-one correspondence to the openings of the battery cell cases, so that the electrolyte storage pipeline communicates with the battery cells.

Preferably, one end of the main pipeline is provided with an electrolyte injection and gas extraction part, which communicates with the electrolyte storage cavity to vacuumize the electrolyte storage pipeline or inject electrolyte into the electrolyte storage pipeline.

Preferably, the electrolyte injection and gas extraction part is a control valve.

Preferably, the main pipeline is provided with a pressure relief part.

Preferably, the opening of each of the battery cell cases is provided with a pipeline switch, which is connected to the branch pipes to control the circulation of electrolyte between the electrolyte storage pipeline and the battery cells.

Preferably, the opening of the battery cell case is provided with the dissoluble mechanism according to claim 1 to seal the opening; when the dissoluble assembly contacts with the electrolyte inside the electrolyte storage pipeline, the dissoluble assembly is dissolved, thereby the interior of the battery cell communicates with the electrolyte storage pipeline.

Preferably, a connecting base is provided with at the opening of the case, and comprises a base and a connecting pipe connected to the base, wherein the dissoluble mechanism is arranged in the connecting base to seal the opening.

Compared with the prior art, the present application attains the following beneficial effects:

In the present application, a dissoluble mechanism is provided on the opening of the battery cell case. The dissoluble mechanism seals the opening of the battery cell case when the battery cell is in a natural state, so that the electrolyte inside the battery cell is isolated from the external environment; when one or more battery cells are placed in the electrolyte cavity of a high-capacity battery, the dissoluble mechanisms on the battery cell cases are dissolved by the external electrolyte, so that the openings of the cases are opened, and the electrolyte cavities of the battery cells communicate with the electrolyte cavity of the high-capacity battery, and the battery cells are in a shared electrolyte system.

The battery cell case structure having the dissoluble mechanism in the present application realizes communication between the electrolyte cavities of the battery cells and the electrolyte cavity of the high-capacity battery without mechanical operation, and has high applicability.

In the high-capacity battery that utilizes the technical scheme in the present application, the cavities of the battery cells communicate with each other through the electrolyte storage pipeline, so that the battery cells are in the same electrolyte system, thereby the problem of local overheat incurred by differences among the battery cells is alleviated, the uniformity of the battery performance is improved, the cycle performance of the battery is improved, and the service life of the battery is prolonged. In addition, the high-capacity battery can be manufactured through a simple process, and has a simple structure and a low cost.

Through the pipeline of the electrolyte storage system in the present application, electrolyte can be injected and replenished into the battery cells, thereby the electrolyte injection/replenishment efficiency is improved.

With the technical scheme of the present application, the pressure withstand requirement for the case is lowered, and the materials are reduced.

DETAILED DESCRIPTION OF THE EMBODIMENTS

Figure 1:
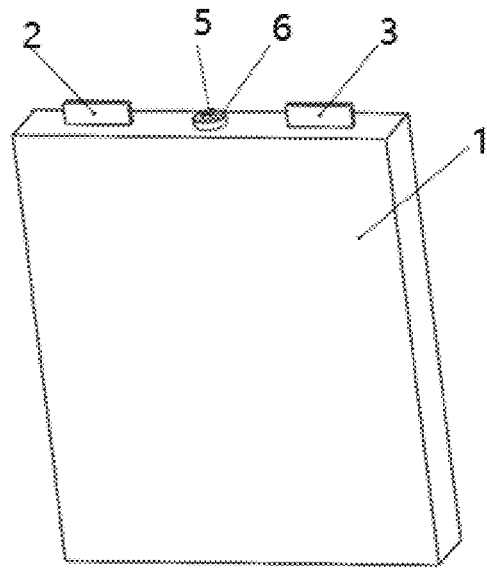
FIG. 1 is a schematic structural diagram of a battery cell case having a dissoluble mechanism, in which the isolating assembly is a protective film.
Figure 2:
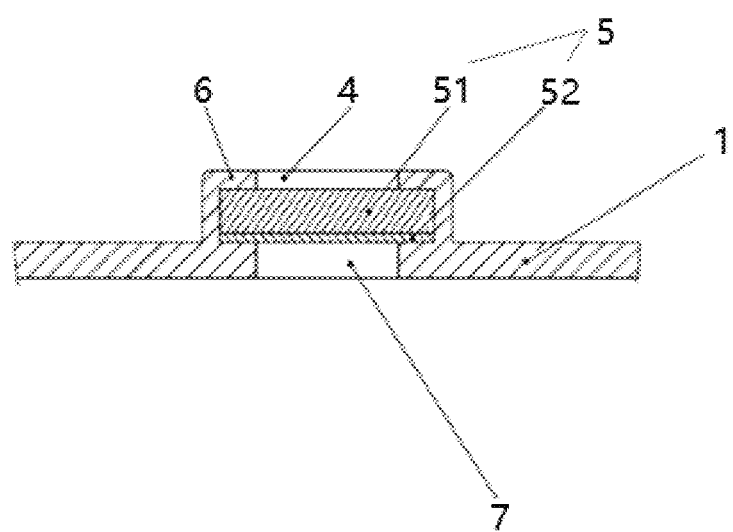
FIG. 2 is a cross-sectional view of the battery cell case having a dissoluble mechanism, in which the isolating assembly is a protective film.

To make the objects, technical scheme and advantages of the present application understood more clearly, hereunder the present application will be further detailed in embodiments, with reference to the accompanying drawings. It should be understood that the embodiments described hereunder are only provided to interpret the present application but don't constitute any limitation to the present application.

Embodiment 1

This embodiment provides a battery cell case 1 having a dissoluble mechanism. The dissoluble mechanism 5 comprises a dissoluble assembly 51 and an isolating assembly 52. The isolating assembly 52 is a polypropylene film in thickness of 0.1 mm, and the dissoluble assembly 51 is a polymethyl methacrylate plate in thickness of 2 mm. The polypropylene film fully covers the opening 7 of the case, and the polyethylene film is attached to a side of the dissoluble assembly 51 that faces the opening of the case. Both the area of the polypropylene film 52 and the area of the polymethyl methacrylate plate 51 are greater than the area of the opening 7 of the case. Therefore, the dissoluble mechanism 5 can cover the opening 7 of the case to isolate the electrolyte inside the cavity of the battery cell from the external environment. A fixing part 6 is provided outside the opening 7 of the case to limit the movement of the dissoluble mechanism 5 in the thickness direction, so that the polymethyl methacrylate plate coated with the polypropylene film seals the opening 7 of the case.

During use, a plurality of battery cells in battery cell cases having the dissoluble mechanism are placed in the electrolyte cavity of the high-capacity battery. The polymethyl methacrylate plate 51 on the opening 7 of each case is gradually dissolved and disappears owing to the contact with the external electrolyte, and the polypropylene film 52 falls off the opening 7 of the case as the electrolyte flows, thereby the opening 7 of the case communicates with the external environment, the electrolyte in the electrolyte cavity of the high-capacity battery flows through the opening 7 of each case into each battery cell, so that the electrolyte cavities of the battery cells communicate with the electrolyte cavity of the high-capacity battery.

Alternatively, in this embodiment, the isolating assembly may be a polyethylene film.

Embodiment 2

Figure 3:
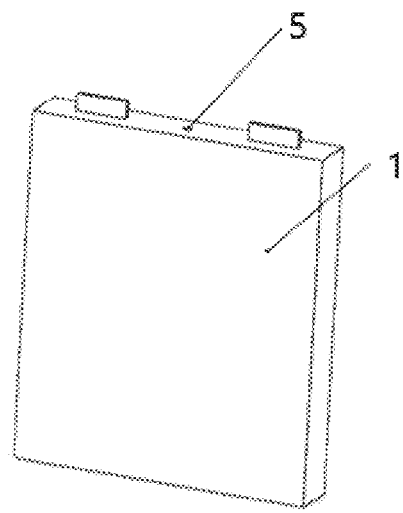
FIG. 3 is a schematic structural diagram of a battery cell case having a dissoluble mechanism, in which the isolating assembly is a sphere.
Figure 4:
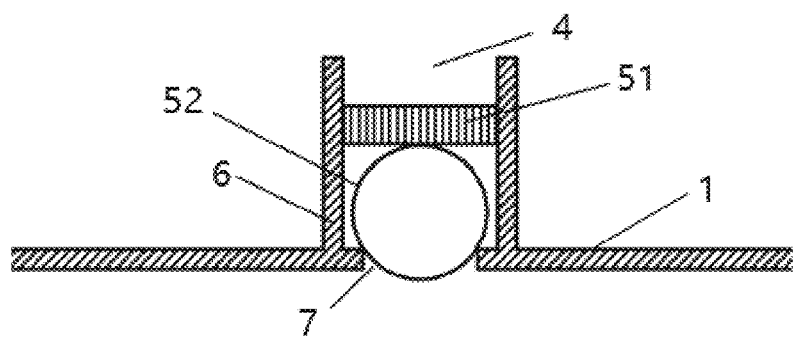
FIG. 4 is a cross-sectional diagram of the battery cell case having a dissoluble mechanism, in which the isolating assembly is a sphere.

As shown in FIGS. 3-4, in this embodiment, the opening 7 of the case is circular, the isolating assembly 52 is a sphere, a fixing part 6 is arranged outside the opening, the sphere 52 is arranged inside the fixing part 6, and clearance is reserved between the fixing part 6 and the sphere 52; the dissoluble assembly 51 is a polymethyl methacrylate plate in thickness of 3 mm, the diameter of the sphere 52 is greater than that of the opening 7 of the case, thereby the polymethyl methacrylate plate 51 can cover the opening 7 of the case, and the polymethyl methacrylate plate 51 abuts against the sphere, so that the sphere 52 seals the opening 7 of the case. The polymethyl methacrylate plate 51 is fixed to the fixing part 6 by threading or snap-fitting. The sphere 52 may be made of glass or metal.

In use, a plurality of battery cells in battery cell cases 7 having the dissoluble mechanism are placed in the electrolyte cavity of the high-capacity battery, the polymethyl methacrylate plate 51 is gradually dissolved and disappears owing to the contact with the external electrolyte. Since the sphere 52 is no longer abutted by the polymethyl methacrylate plate 51 and there is certain clearance between the fixing part 6 and the polymethyl methacrylate plate 51, the sphere moves, and the opening 7 of the case communicates with the external environment in part or in entirety. Thus, the electrolyte inside the electrolyte cavity of the high-capacity battery flows through the openings 7 of the cases into the cavities of the battery cells, thereby the electrolyte cavities of the battery cells communicate with the electrolyte cavity of the high-capacity battery.

Embodiment 3

Figure 5:
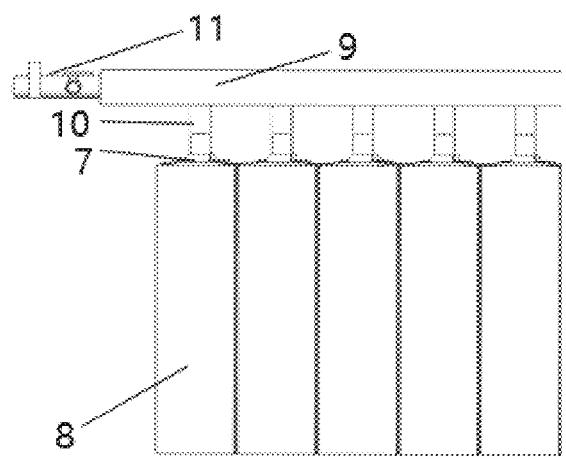
FIG. 5 is a structural diagram of a high-capacity battery.
Figure 6:
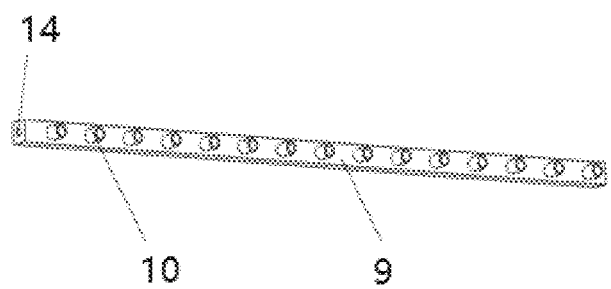
FIG. 6 is a structural diagram of the electrolyte storage pipeline of the high-capacity battery.

As shown in FIGS. 5-6, this embodiment provides a high-capacity battery, which comprises a plurality of battery cells 8 connected in shunt or in series and an electrolyte storage pipeline, wherein the electrolyte storage pipeline comprises a main pipeline 9 that is a multi-branch electrolyte storage pipeline and a plurality of branch pipes 10. In the figures, there are 5 battery cells, and the main pipeline 9 has 5 branch pipes; the main pipeline has an electrolyte storage cavity 14 therein to accommodate the electrolyte, the branch pipes 10 are arranged between the main pipeline 9 and the battery cells 8, each of the battery cells 8 is provided with an opening 7, and the branch pipes 10 are connected to the openings 7 in one-to-one correspondence, for example, by welding. Electrolyte is filled into the electrolyte storage pipeline 9, and flows through the branch pipes 10 and the openings 7 of the cases into the battery cells 8; a certain volume of electrolyte can be stored in the electrolyte storage pipeline to ensure that the battery cells are in the same electrolyte system after the battery cells are filled with the electrolyte. Thus, each battery cell has the same volume of electrolyte therein in the process of use, so as to reduce the difference in performance among the battery cells incurred by a difference in electrolyte consumption among the battery cells.

In an embodiment, the main pipeline 9 is provided with an electrolyte injection and gas extraction part 11, through which the pipeline is vacuumized before the electrolyte is injected, so as to eliminate the air inside the pipeline and the battery cells and ensure the product quality.

In an embodiment, the electrolyte injection and gas extraction part may be a control valve, so as to realize electrolyte injection and vacuum pumping of the pipeline.

Figure 7:
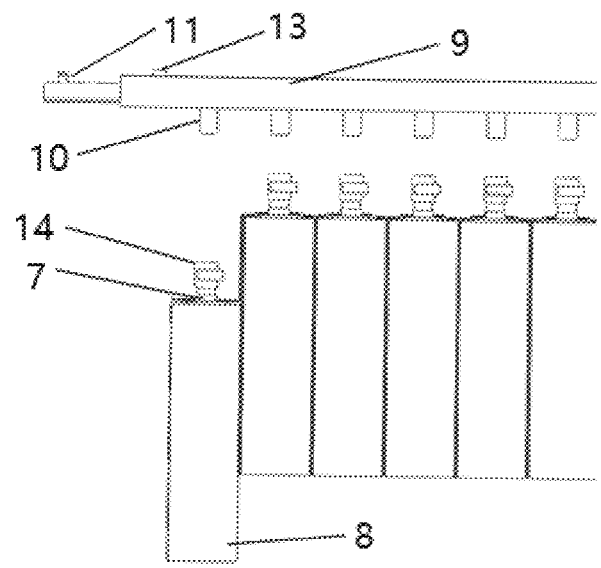
FIG. 7 is a structural diagram of a high-capacity battery, with a pipeline switch arranged at the opening of each case.

In an embodiment, as shown in FIG. 7, the electrolyte storage pipeline is provided with a pressure relief part 13. In the case that the opening 7 of each battery cell connected to a branch pipe is an explosion venting port, the pressure relief part 13 on the main pipeline 9 can be used to relieve pressure from the battery cells, to ensure the safety of the battery. The pressure relief part may be a pressure relief film arranged on the opening of the main pipeline 9 or a pressure relief valve arranged at the opening of the main pipeline.

Embodiment 4

As shown in FIG. 7, this embodiment provides a high-capacity battery, which comprises a plurality of battery cells 8 connected in shunt or in series and an electrolyte storage pipeline. The electrolyte storage pipeline comprises a main pipeline 9 that is a multi-branch electrolyte storage pipeline and a plurality of branch pipes 10. The opening 7 of each battery cell is provided with a pipeline switch 14, which is connected to a branch pipe 10. Thus, the flow of the electrolyte through the branch pipes to the battery cells 8 can be controlled respectively. When the pipeline switches 14 are opened after the electrolyte is injected into the electrolyte storage pipeline 9, the electrolyte in the electrolyte storage cavity flows into the battery cells; thus, the battery cells are in a uniform electrolyte system. When the pipeline switches are closed, the openings of the cases of the battery cells are sealed.

Embodiment 5

Figure 8:
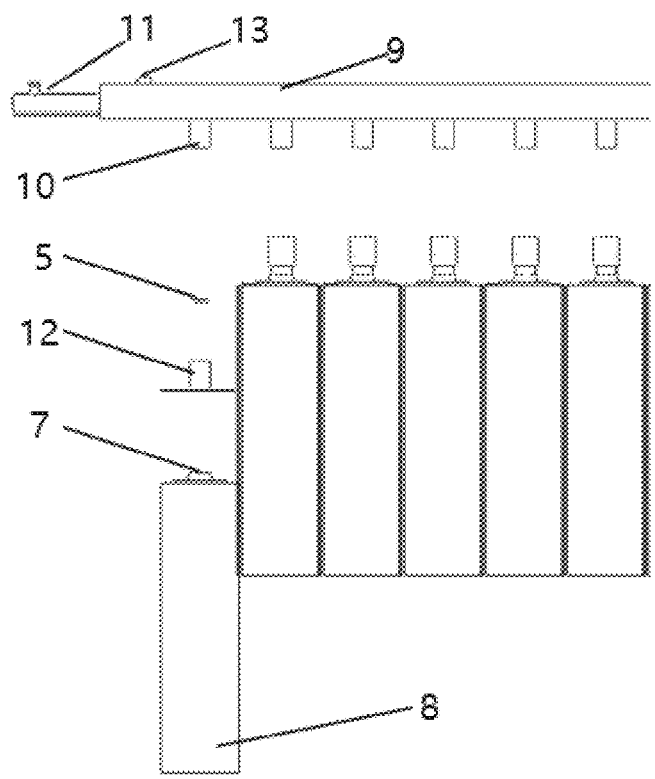
FIG. 8 is a structural diagram of a high-capacity battery, with a dissoluble mechanism arranged at the opening of each case.
Figure 9:
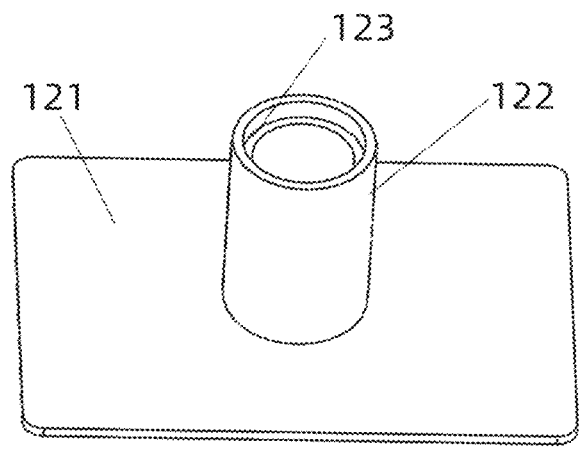
FIG. 9 is a structural diagram of the connecting base at the opening of each case.

As shown in FIGS. 8 and 9, this embodiment provides a high-capacity battery, which comprises a plurality of battery cells 8 connected in shunt or in series and an electrolyte storage pipeline. The electrolyte storage pipeline comprises a main pipeline 9 that is a multi-branch electrolyte storage pipeline and a plurality of branch pipes 10. The opening 7 of each battery cell is provided with a dissoluble mechanism 5, which is a polymethyl methacrylate plate in thickness of 2 mm. The opening of each case is provided with a connecting base 12, which comprises a base 121 and a connecting pipe 122, wherein the base is provided with a through-hole for communication with the opening 7 of the case, the connecting pipe 122 may be fixedly connected to the base, so that the connecting pipe 122 and the base form a channel for the electrolyte to flow into the battery cell. The connecting pipe 122 is provided with a support platform 123. Electrolyte is injected into the electrolyte storage pipeline 9. When the electrolyte in the branch pipes 10 flows into the connecting pipes 122, the polymethyl methacrylate plates are gradually dissolved and disappear owing to the contact with the electrolyte; thus, the openings of the battery cells are opened, the electrolyte flows into the openings of the battery cells, and the electrolyte storage cavity stores a certain volume of electrolyte, thereby the plurality of battery cells are in the same electrolyte system. In this embodiment, the openings of the battery cell cases can also be opened without mechanical operation of switches when electrolyte is to be filled or replenished into the battery cells. The structure is simple, and the operation is convenient.

In another embodiment, the dissoluble mechanism comprises a dissoluble assembly and an isolating assembly, wherein the dissoluble assembly is a polymethyl methacrylate plate in thickness of 3 mm, the isolating assembly is a polypropylene film in thickness of 0.1 mm and covers the support platform; in addition, the polypropylene film is attached to a side of the polymethyl methacrylate plate that faces the opening of the case to seal the opening of the case. The connecting pipe 122 is connected to a branch pipe 10. Since the polypropylene film is arranged on the side facing the opening of the case and insoluble in the electrolyte, the polypropylene film will not be dissolved by the electrolyte evaporated from the battery cell. Thus, the polypropylene films will not be dissolved even if they come into contact with the electrolyte in a case that the battery undergoes tilting or vibration in the transportation process, which is to say, the polypropylene films still keep the battery cells in a sealed state in such a case. When the electrolyte in the branch pipes 10 flows into the connecting pipes 122 after the electrolyte is injected into the electrolyte storage pipeline 9, the polymethyl methacrylate plates are gradually dissolved by the electrolyte and disappear. As the electrolyte flows, the polypropylene films move and no longer seal the openings of the cases. Thus, the openings of the battery cells are opened, and the electrolyte flows into the openings of the battery cells, thereby the electrolyte is filled into the battery cells; in addition, the electrolyte storage cavity stores a certain volume of electrolyte, thereby the battery cells are in a uniform electrolyte system.

Alternatively, in the present application, the isolating assembly may be made of polyethylene.

The technical features of the above embodiments may be combined freely. For the purpose of concise description, not all possible combinations of the technical features in the above embodiments are described. However, all such combinations of those technical features should be deemed as falling in the scope defined by the specification, as long as there is no contradiction among the combinations.

Although the above embodiments describe several implementations of the present application specifically in detail, they should not be understood as constituting any limitation to the scope of the present application. Those having ordinary skills in the art should understand that various modifications and improvements can be made without departing from the concept of the present application, but all such modifications and improvements shall be deemed as falling in the scope of protection of the present application. Therefore, the scope of protection of the patent application is only defined by the annexed claims.

The invention claimed is:

1. A battery cell case having a dissoluble mechanism, wherein the battery cell case is provided with at least one dissoluble mechanism, which comprises an isolating assembly and a dissoluble assembly; wherein
the battery cell case is provided with an opening, the isolating assembly and the dissoluble assembly are arranged sequentially in a direction away from the battery cell case; the dissoluble assembly fixes the isolating assembly, and the isolating assembly abuts against the dissoluble assembly so that they seal the opening together;
when the dissoluble assembly contacts with electrolyte outside the battery cell case, the isolating assembly is opened because the dissoluble mechanism is dissolved, thereby the interior of the battery cell case communicates with the exterior of the battery cell case.

2. The battery cell case having a dissoluble mechanism according to claim 1, wherein the dissoluble assembly is made of one or more of polymethyl methacrylate, polyvinyl chloride, polycarbonate or ABS plastic material.

3. The battery cell case having a dissoluble mechanism according to claim 2, wherein the dissoluble assembly is a polymethyl methacrylate plate.

4. The battery cell case having a dissoluble mechanism according to claim 3, wherein the thickness of the dissoluble assembly is not greater than 2 mm.

5. The battery cell case having a dissoluble mechanism according to claim 3, wherein the isolating assembly is a sphere or a cone.

6. The battery cell case having a dissoluble mechanism according to claim 5, wherein a fixing part is provided outside the opening, the isolating assembly is arranged inside the fixing part and doesn't contact with the fixing part, and the dissoluble assembly is connected to the fixing part and abuts against the isolating assembly to seal the opening.

7. The battery cell case having a dissoluble mechanism according to claim 1, wherein the isolating assembly is a protective film that is insoluble in the electrolyte.

8. The battery cell case having a dissoluble mechanism according to claim 7, wherein the isolating assembly covers the opening, and the isolating assembly covers a side of the dissoluble assembly that faces the opening to seal the opening.

9. The battery cell case having a dissoluble mechanism according to claim 8, wherein a fixing part is arranged at the opening to limit the movement of the dissoluble mechanism.

10. The battery cell case having a dissoluble mechanism according to claim 7, wherein the thickness of the protective film is smaller than 0.1 mm.

11. A battery cell, comprising an electrode assembly and the battery cell case according to claim 1, wherein the electrode assembly is arranged in an encapsulating cavity of the case.

12. A high-capacity battery, comprising at least two battery cells according to claim 11 and an electrolyte storage pipeline, wherein the electrolyte storage pipeline comprises a main pipeline that is a multi-branch electrolyte storage pipeline and a plurality of branch pipes, the main pipeline has an electrolyte storage cavity therein for accommodating the electrolyte, the branch pipes are arranged between the main pipeline and the battery cell cases, each of the battery cell cases is provided with an opening, the branch pipes are in one-to-one correspondence to the openings of the battery cell cases, so that the electrolyte storage pipeline communicates with the battery cells.

13. The high-capacity battery according to claim 12, wherein one end of the main pipeline is provided with an electrolyte injection and gas extraction part, which communicates with the electrolyte storage cavity to vacuumize the electrolyte storage pipeline or inject electrolyte into the electrolyte storage pipeline.

14. The high-capacity battery according to claim 13, wherein the electrolyte injection and gas extraction part is a control valve.

15. The high-capacity battery according to claim 12, wherein the main pipeline is provided with a pressure relief part.

16. The high-capacity battery according to claim 12, wherein the opening of each of the battery cell cases is provided with a pipeline switch that replaces the dissoluble mechanism, wherein the pipeline switches are connected to the branch pipes to control the circulation of electrolyte between the electrolyte storage pipeline and the battery cells.

17. The high-capacity battery according to claim 16, wherein a connecting base is provided with at the opening of the case, and comprises a base and a connecting pipe connected to the base, wherein the dissoluble mechanism is arranged in the connecting base to seal the opening.

18. A high-capacity battery pack, comprising a plurality of high-capacity batteries according to claim 12.

19. A high-capacity battery energy storage system, comprising a plurality of high-capacity battery packs according to claim 18.

* * * * *